Sept. 17, 1935. B. B. WEBSTER 2,014,675
EDUCATIONAL APPLIANCE
Filed June 23, 1934
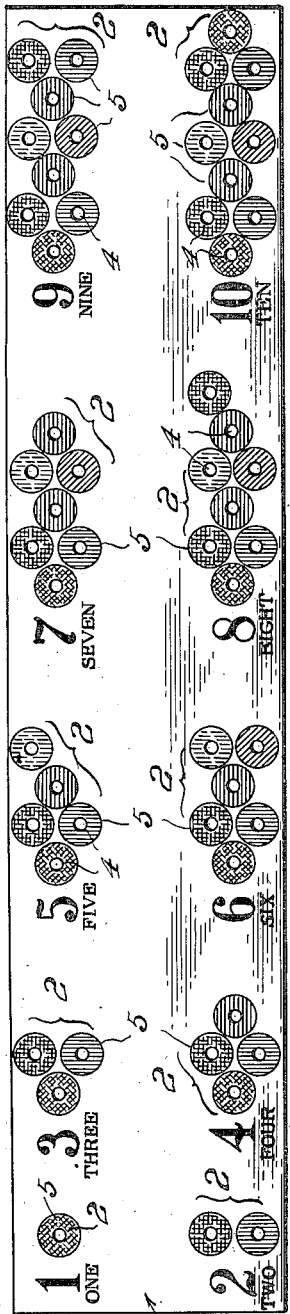
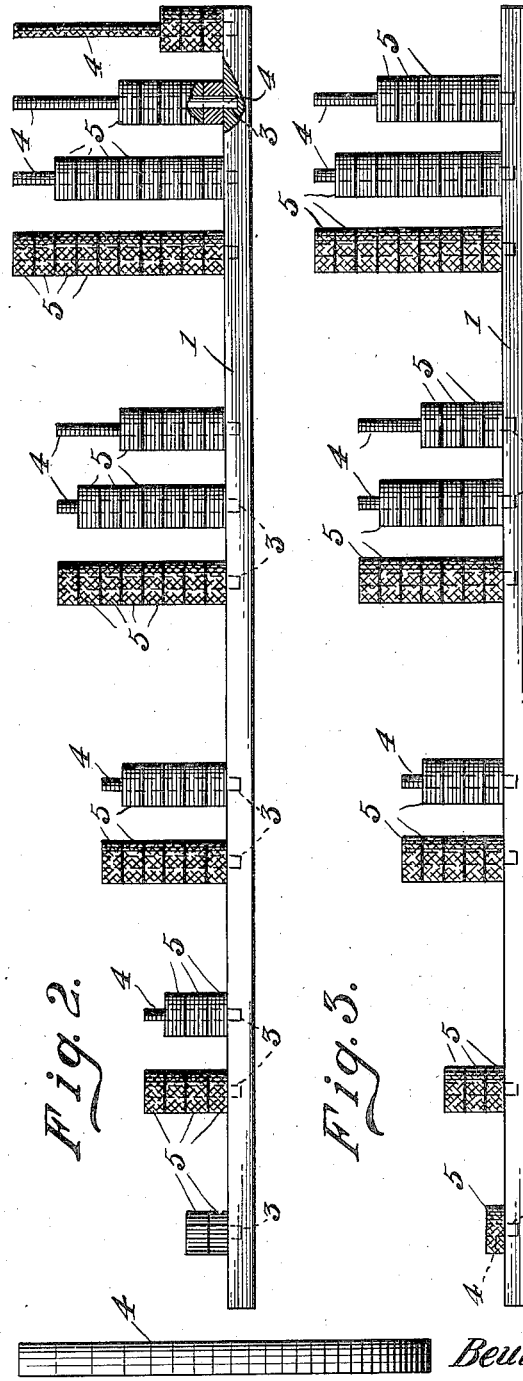
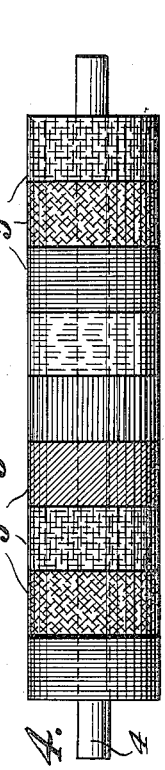
Inventor
Beulah B. Webster
By
E. E. Weaver
Attorney Patented Sept. 17, 1935

2,014,675

UNITED STATES PATENT OFFICE 2,014,675

EDUCATIONAL APPLIANCE

Beulah Brubaker Webster, Madison, Wis.

Application June 23, 1934, Serial No. 732,169

2 Claims. (Cl. 35—73)

This invention relates to educational appliances applicable for use in the instruction of young children particularly in the elemental grades of school, as for instance in the kindergarten and primary grades where the mind of the pupil should be and actually is more rapidly developed through the vision and the manipulation of tangible devices, which in the particular invention are variously colored to lend greater attraction, and demand the more readily the attention of the student, for the several purposes which will be understood and appreciated by the instructor, upon futher reference to the specification.

More particularly the appliance contemplates the provision of a playing or working board or surface having a plurality of groups of vertical pegs or supports, which pegs or supports of each group are colored to correspond with the primary and secondary colors of the spectrum, which as well known are red, yellow and blue, and orange, purple and green respectively. Associated with the various pegs or supports are a plurality of disks, also colored to correspond with the primary and secondary colors of the spectrum, the disks of one color or the complements thereof being adapted for use with the colored peg of corresponding color.

The appliance further contemplates providing the pegs in the several groups of the series in graduated lengths for the purpose of accommodating, for example from one disk up to ten as will be particularly described as to construction and function hereinafter.

The principal objects of the invention are twofold; namely to educate children in the determination of and distinction between the various colors of the spectrum, and to instruct them in simple mathematics, such as simple addition, subtraction and multiplication through their ability to visualize attractive colored disks or similar tangible devices, and to associate the disks on one peg with those of another or adjacent peg, as for example by counting the disks on one peg and adding the number of disks on an adjacent or another peg, or having counted the disks on any group of pegs, remove the disks on one or more pegs of the group to determine the remainder. While this explanation will seem simple enough to the advanced mind of the ordinary person, at the same time it will be appreciated by him how the simple arrangement which is herein described will be of great aid in the instruction of the child of normal mental intellect of from five to seven years of age.

The appliance further teaches a child the reading of numerals and the spelling thereof by the association of the two forms of designation combined with the peg and disk groups.

The appliance is capable of performing many functions from a mathematical standpoint as well as being permissible of many variations of color appreciation, in addition to which the device may be operated so that color teaching and mathematical instruction will be inter-related, so that the pupil may work problems in simple mathematics with the color element as a part of the combination.

It is believed unnecessary to attempt to describe each and all problems of which the appliance is capable, as these are extremely numerous, and different instructors may devise varied ways of combining the mathematical and color elements of the invention, and the pupil may devise ways and means of operating the device peculiar to himself.

In the accompanying drawing,

Fig. 1 is a top plan view of the device;

Fig. 2 is a side elevation of the device showing the pins and disks in the front row, or from 2 to 10;

Fig. 3 is also a side elevation, but showing the rear set of pins and disks, or from 1 to 9, inclusive;

Fig. 4 is a view of one of the pins removed from the board, and showing a set of disks mounted thereon, the colors of which are arranged in the order of the spectrum;

Fig. 5 is an end view of Fig. 4; and

Fig. 6 is a view of one of the pins in which the primary or secondary color is painted on the bottom of the pin, and in which the intensity of the color on the bottom is gradually neutralized with white toward the top.

Referring more specifically to the drawing by numerals of reference, 1 indicates a base board, rectangular in shape, and usually about two and a half feet in length by six inches in width, although the dimensions may be altered as may be required, the size mentioned being found quite suitable since it enables the various parts to be made of a size readily handled and operated.

The board is provided upon its upper face with a plurality of groups 2 of pegs which may be colored and which are supported in recesses 3 provided in the upper surface of said board, said pegs being easily placed in or removed at will from the recesses.

Referring to Figure 1 which more clearly illustrates the arrangement of groups of pegs which may be colored, I have shown the board provided with a plurality of groups of pegs, which in number are arranged in numerical sequence, that is, from 1 to 10. It will be seen upon reference to Figs. 1 and 3, which latter illustrates the back row of pins, that the first group contains just one pin and one disk; the adjacent group, three pins, each of which is of sufficient height to accommodate three disks; the adjacent group, five pins, each of which is of a height to accommodate five disks, and so on.

Referring to Figs. 1 and 2, which latter shows the front row of pins, it will be noted that the several groups of pins are of the even number; that is, two, four, six, eight and ten, the pins of the several groups being of just the exact height to receive the number of disks which the number adjacent to it indicates.

For sake of illustration, although the color scheme may be readily changed as desired, I will first refer to that which I call group 1, although this really contains a single pin or peg 4. The recess 3 is surrounded with a colored ring, 5, which in the present instance is "orange"; adjacent the pin or peg and colored ring is painted the numeral "1", and in close proximity thereto is printed or painted the word "one", so that the young student learns to associate the written word as well as the number. It is to be noted that, as shown, the pin or peg 4 as well as the disk 5 is of an "orange" color, the disk having a central opening 6 to permit the peg to pass therethrough.

In the second group in the rear row, that containing the three pegs, there are three recesses in the surface of the board, each of which is surrounded with a colored ring 5. In this group, one of the rings is of "orange" color; one of "red" and one of "yellow", corresponding in color with the pegs or pins in the recesses. It is of course understood that the pins or pegs in the group just mentioned are of a height only to accommodate three disks.

In group five, the pins or pegs are of a sufficient length to accommodate five disks which correspond in color to that of the pegs, the colors in this group being, for sake of illustration, "orange", "red", "yellow", "blue" and "purple."

In group seven, in the rear row, the colors added to group five are "green" and again "blue".

In the front row, group two, the pins and disks thereon are "red" and "yellow"; group four, colors of pins and disks being respectively "orange", "red", "yellow" and "blue." In group six, the colors are "yellow", "red", "orange", "blue", "green" and "purple." In group eight, from left to right, the colors are "orange", "red", "yellow", "blue", "green", "purple", and again "blue" and "yellow". In group ten, the color scheme is from left to right; "orange", "yellow", "red", "blue", "green", "purple" and repeating, "blue", "red", "yellow", and "orange", the idea being that the colors are arranged in the order of the spectrum. It will be understood that the pegs, say for instance in the eight or ten groups are of a height just sufficient to receive the number of disks which the number adjacent the group indicates.

It will be understood also that adjacent each group of pegs or pins containing the disks, throughout the series, will be indicated by printing or painting on the face of the board, the number of pins or pegs in each group and the number of disks which each peg or pin will accommodate.

As shown in Fig. 6, the base of the pin or peg is painted or dyed in one of the primary or secondary colors, corresponding to the color of the ring 5, surrounding the recess or opening 6 in which the pin is adapted to be placed. It is obvious that this apparatus can readily be used by making the pins, each of uniform color throughout its length, or by providing the base of the pin in one of the primary or secondary colors, and, as stated, gradually fading the color toward the top. In this way, the student learns by placing the disks on the pins, just which colors he must select to correspond with that portion of the pin which coincides with the colored disk.

The above description merely sets forth the mechanical construction of the apparatus, and it is quite obvious that an unlimited number of children's games both educational and instructive may be played with this device, but the following description of a manner of use will be sufficient to illustrate one of many how it may be employed.

To recapitulate:—

The purpose of this device is to make use of tangible objects to impress a child's mind with ordinary and important distinctions used by adults, namely colors and pluralities.

It is intended to appeal to a child's overwhelming desire to feel things and to see things. It aims to be very simple, a plaything in fact, but arranged so as to have enough substance to challenge the child of two who needs a simple and colorful peg board and disks, as well as the child of six who needs a number board that illustrates very simply the tangible, concrete objects that correspond simultaneously with the abstract symbols of pluralities.

The arrangement of pegs, colors, pluralities and symbols, together with the way they may be used is as follows:

The light weight rectangular board, preferably wooden, is bored with the holes for the pins or pegs preferably removable, or the board may be fitted up otherwise with projections according to the design seen in the drawing.

Encircling each hole or projection is a specific band of one of the primary or one of the secondary colors, these same colors being also painted on the bottom portion of the corresponding pin or peg for that particular recess and circle of color found on the board. But the intensity of the color on the base portion of the pins or pegs is gradually neutralized with white so that a pastel shade of that same color is visible at the top portion of the pin. The length of the various pins or pegs is, of course, dependent upon the increasing number of disks each pin is to be fitted with. The orange pin for the single orange spot in the upper left hand corner of the board is about half as long as the red and the yellow pins for the red and the yellow spots in the lower left hand corner of the board because only one orange disc goes on the single orange pin that is symbolized by 1, whereas two disks, that differ only in hue, go on the graduated red and the yellow pins set together as a unit for the symbol 2.

The mathematical symbols for the different pluralities are painted close to the pins grouped to represent that symbol so that the symbol may become a constant part of the whole visual image for any particular group of pluralities on the board.

The color arrangement selected for the circles and pins is intended to bring an association, as close as possible, of the secondary color that always comes from a blending of certain primary colors. For example, the third group of pins contains the two primary colors, yellow and red, found in group 2, that are always necessary to make the one color of orange, found in 1. Mathematically 3 is 1 with 2 added to it. This fact may be written down to look like this: 3=1+2. Since the 2 is 1 object +1 more object, it may be written as 2=1+1.

When 3 is written as 3=1+2 it has a 2 in it which may be written as 1+1. Consequently the 3 may also be written as 1+1+1 as well as 3=1+2. Thus, it is believed, that by appealing to the child's desire to feel things and to his love for colors, the number combinations may be indeed fully "felt" and enjoyed as a part of his work and not just memorized abstractly by role.

The group for 4 and its symbol is located at the bottom of the board far enough away from 2 to stand out as a separate and distinct unit. It is under 3 which is at the top of the board near 1. This arrangement keeps odd numbers in one row at the top and even numbers in another row at the bottom of the board. 4 has in it everything found in 3 plus one new factor. Blue, a dark color, was selected for the color of the new factor, first, to try to make vivid the combination of 3+1 (the 3 is in light colors, the 1 is in dark color) and, secondly, to introduce the remaining primary color, that is, blue.

When that blue is blended with the red which is diagonally below it, it will make a secondary color called violet, seen in the new factor needed to make the next number—5. When the blue is blended with the yellow that is diagonally above it, it will make a different secondary color called green which is used for the new factor needed to make 6.

For the groups of 7, 8, 9, 10, the colors used to illustrate 4, 3, 2, 1 are reversed so that a dark unit of 4 can be "felt" as one unit that contrasts with and separates the lighter units of 1, 2 or 3, that are on the ends of the group as a whole. It is thought that this contrast may aid the visualization of combinations. The reversal of color arrangement also keeps red, blue, and purple in one diagonal line and the yellow, blue and green in another diagonal line. This arrangement of color permits the complementary colors to fall into horizontal lines. For example red-green; orange-blue; yellow-purple; each is in a separate line. After the discs are fitted into place on the dowels, this arrangement of color and hues produce a regular symphony of color that changes its character constantly as the board is rotated.

The multiplicity of colors may stimulate the increasing of a child's color vocabulary for on the red pin appears such hues of red as scarlet, crimson, cerise, pink and pastel. Orange runs up to buff; yellow to cream; violet to orchid; dark green to pastel green; dark blue to sky blue.

It is believed also that the proper use of the colored disks that fit on the pins will vivify the multiplication of numbers and stimulate the building of multiplication tables. For example, when one disk is placed on each of the three pins of 3, for instance, it may be written down as 3 (i. e. symbol on the board) ×1 (disk on each dowel) =3.

When another disk is added that may be written down as 3×2=6. When a third and last disk, which completes the square of 3, is added that may be written down as 3×3=9.

What I claim is:

1. An educational appliance comprising a working board having a plurality of groups of pegs, a number identifying each of the various groups, the number of pegs in each group corresponding to its numerical designation, the pegs of any one group being of the same length, the pegs of the respective groups taken in order according to numerical designation increasing in length progressively and in a predetermined mathematical relationship, apertured discs of uniform thickness adapted to be placed on the pegs of the several groups, and the pegs being of such lengths that the maximum number of discs capable of being accommodated on any one peg corresponds to the numerical designation of the group with which said peg is identified.

2. An educational appliance comprising a working board having a plurality of groups of pegs, a number identifying each of the various groups, the number of pegs in each group corresponding to its numerical designation, the pegs of the respective groups taken in order according to their numerical designation increasing progressively by unity in length, the pegs of any one group being of the same length, discs of uniform thickness adapted to be placed on the pegs, unity being defined as the thickness of a single disc, and the pegs being of such length that the maximum number of discs capable of being accommodated on any one peg corresponds to the numerical designation of the group with which said peg is identified.

BEULAH BRUBAKER WEBSTER.